United States Patent
Mysore et al.

(10) Patent No.: US 7,672,401 B2
(45) Date of Patent: Mar. 2, 2010

(54) SYSTEM AND METHOD FOR DATA COMMUNICATION OVER MULTI-INPUT, MULTI-OUTPUT CHANNELS

(75) Inventors: Naveen Mysore, Kirkland (CA); Jan Bajcsy, Montreal (CA)

(73) Assignee: McGill University, Montreal, Quebec (CA)

( * ) Notice: Subject to any disclaimer, the term of this patent is extended or adjusted under 35 U.S.C. 154(b) by 1157 days.

(21) Appl. No.: 10/544,108

(22) PCT Filed: Feb. 2, 2004

(86) PCT No.: PCT/CA2004/000137
§ 371 (c)(1),
(2), (4) Date: Aug. 2, 2005

(87) PCT Pub. No.: WO2004/071001
PCT Pub. Date: Aug. 19, 2004

(65) Prior Publication Data
US 2006/0135081 A1 Jun. 22, 2006

(51) Int. Cl.
H03K 9/00 (2006.01)
(52) U.S. Cl. .............. 375/316; 370/203; 370/362; 375/148; 375/224; 375/233; 375/260; 375/341; 375/346; 375/350
(58) Field of Classification Search .......... 375/295, 375/316
See application file for complete search history.

(56) References Cited
U.S. PATENT DOCUMENTS
5,852,630 A * 12/1998 Langberg et al. ............ 375/219
(Continued)

FOREIGN PATENT DOCUMENTS
EP    0 998 045 A1    5/2000
(Continued)

OTHER PUBLICATIONS
Matthew Valenti and Brian D. Woerner, Iterative Multiuser Detection for Convolutionally Coded Asynchronous DS-CDMA, 9th IEEE International Symposium . . . , Sep. 9, 1998, 21 pages.
(Continued)

*Primary Examiner*—Shuwang Liu
*Assistant Examiner*—Dhaval Patel
(74) *Attorney, Agent, or Firm*—Perley-Robertson, Hill & McDougall LLP/s.r.l.

(57) ABSTRACT

System and method for estimating data transmitted by a plurality of transmit elements across a communications channel. The system comprises a plurality of receive interfaces, each operative to receive a signal via the channel and output a respective sequence of received data elements. The system also comprises a space matched filter connected to the plurality of receive interfaces and operative to (i) assemble the received data elements into sets of received data elements, each the set of received data elements including at least one received data element from each sequence of received data elements; and (ii) jointly process each set of received data elements with each of a plurality of channel data elements to produce a corresponding plurality of filtered data elements, each filtered data element being associated with one of the transmit elements, each channel data element being representative of a portion of the channel between an associated one of the transmit elements and the plurality of receive interfaces. Finally, the system comprises a detector connected to the space matched filter and operative to process each filtered data element to produce a corresponding decision data set therefor.

25 Claims, 6 Drawing Sheets

U.S. PATENT DOCUMENTS

| | | | |
|---|---|---|---|
| 6,081,566 A | 6/2000 | Molnar et al. | |
| 6,173,014 B1 | 1/2001 | Forssen et al. | |
| 6,745,050 B1 * | 6/2004 | Forsythe et al. | 455/561 |
| 6,757,322 B2 * | 6/2004 | Schilling | 375/141 |
| 7,133,459 B2 * | 11/2006 | Onggosanusi et al. | 375/267 |
| 7,236,536 B2 * | 6/2007 | Hochwald et al. | 375/265 |
| 7,359,313 B2 * | 4/2008 | Chan et al. | 370/210 |
| 7,397,826 B2 * | 7/2008 | Gorokhov | 370/536 |

FOREIGN PATENT DOCUMENTS

| | | |
|---|---|---|
| EP | 1 213 853 A1 | 6/2002 |
| EP | 1 265 377 A2 | 12/2002 |
| WO | PCT/CA2004/000137 | 6/2004 |

OTHER PUBLICATIONS

Chip Fleming, A Tutorial on Convolutional Coding with Viterbi Decoding, copyright © 1999-2002, 6 pages, Spectrum Applications.

Description of the Algorithms (Part 1), copyright © 1999-2002, 7 pages, Spectrum Applications.

Telecommunications and Mission Operations Directorate—DNS Technology Program, Communications Systems Analysis: Turbo Codes, 1 page, Oct. 23, 2002.

* cited by examiner

SYSTEM AND METHOD FOR DATA COMMUNICATION OVER MULTI-INPUT, MULTI-OUTPUT CHANNELS

FIELD OF THE INVENTION

The present invention relates generally to data transmission systems and, more particularly, to transmission and detection techniques for use in an environment characterized by a single or several multi-input, multi-output channels.

BACKGROUND OF THE INVENTION

Reliable wireless transmission is difficult to achieve, since the time varying nature of multipath fading channels makes it a challenge when compared to communication over optical fibre, coaxial cable and copper twisted pair. Although an improvement in bit error rate (BER) can be achieved by increasing the power or bandwidth of transmitted signals, this would be contrary to the efficiency requirements of next generation wireless systems. Diversity schemes, based on multiple transmissions/receptions of data packets, have therefore been proposed as techniques to mitigate fading without increasing the transmitted power.

Prior diversity schemes have included frequency and time diversity. However, these approaches have the disadvantage that additional spectrum or time slots are used, thus reducing the overall system efficiency. On the other hand, space diversity, in which multiple transmit and receive antennas allow separation of received signals using spatial processing techniques, remains a possible alternative allowing improved overall economy and efficiency of a digital cellular system. Space diversity techniques based on multiple transmit and receive antennas are commonly referred to as MIMO (multi-input, multi-output) systems.

However, the various MIMO systems in existence typically trade off implementational simplicity against total achievable data rate. In other words, prior MIMO systems either achieve a high data rate at the expense of either high power consumption or high hardware complexity, or maintain low transmit power but provide a correspondingly low data rate. In either case, co-antenna interference (CAI) is the dominant limiting factor in achieving high data rates. This trade off is a drawback when designing for wireless transmission, since low power consumption and high data rate are both desirable. Hence, there is a need in the industry to provide a high-rate transmission and detection scheme, which can be implemented with relatively low complexity both at the transmitter and the receiver.

SUMMARY OF THE INVENTION

The present invention may be summarized according to a broad aspect as a system for estimating data transmitted by a plurality of transmit elements across a communications channel. The system comprises a plurality of receive interfaces, each receive interface operative to receive a signal via the communications channel and output a respective sequence of received data elements. The system also comprises a space matched filter connected to the plurality of receive interfaces and operative to (i) assemble the received data elements into sets of received data elements, each the set of received data elements including at least one received data element from each sequence of received data elements; and (ii) jointly process each set of received data elements with each of a plurality of channel data elements to produce a corresponding plurality of filtered data elements, each filtered data element being associated with one of the transmit elements, each channel data element being representative of a portion of the communications channel between an associated one of the transmit elements and the plurality of receive interfaces. Finally, the system comprises a detector connected to the space matched filter and operative to process each filtered data element to produce a corresponding decision data set therefor.

According to a second broad aspect, the present invention seeks to provide a method for estimating data transmitted by a plurality of transmit elements across a communications channel. The method comprises receiving a plurality of signals at a plurality of receive interfaces and outputting a respective plurality of sequences of received data elements. The method also comprises assembling the received data elements into sets of received data elements, each set of received data elements including at least one received data element from each sequence of received data elements. The method further comprises jointly processing each set of received data elements with each of a plurality of channel data elements to produce a corresponding plurality of filtered data elements, each filtered data element being associated with one of the transmit elements, each channel data element being representative of a portion of the communications channel between an associated one of the transmit elements and the receive interfaces. The method also comprises processing each filtered data element to produce a corresponding decision data set therefor.

In accordance with a third embodiment of the present invention, there is provided a computer-readable storage medium containing a program element for execution by a computing device to implement a space matched filter. The space matched filter comprises a control entity; and an I/O entity for receiving an array of data elements including at least one data element associated with each of a plurality of receive interfaces in communication with a plurality of transmit elements across a communications channel. The control entity is operative to jointly process each array of received data elements with each of a plurality of channel data elements to produce a corresponding plurality of filtered data elements, each filtered data element being associated with one of the transmit elements, each channel data element being representative of a portion of the communications channel between an associated one of the transmit elements and the plurality of receive interfaces.

The present invention can also be summarized according to a fourth broad aspect as a system for data communication over a multi-input, multi-output (MIMO) channel. The system comprises a transmitter unit including a de-multiplexer for separating an information stream into a plurality of information sub-streams and a plurality of transmit interfaces for simultaneously transmitting respective ones of the information sub-streams over the MIMO channel. The system also comprises a receiver unit, including a plurality of receive interfaces for receiving respective received signals via the MIMO channel and transforming the received signals into streams of received data elements; a space matched filter connected to the receive interfaces, the space matched filter adapted to jointly process a vector formed from received data elements from each stream of received data elements together with each of a plurality of channel data elements, each channel data element being representative of a portion of the MIMO channel between an associated one of the transmit interfaces and the plurality of receive interfaces; a detector connected to the space matched filter and operative to process each filtered data element to produce a corresponding decision data set therefor; and a multiplexer for combining multiple decision data sets for filtered data elements associated with different ones of the transmit interfaces into a single sequence of decision data sets.

The present invention can also be summarized according to a fifth broad aspect as a system for estimating data transmitted from each of a plurality of users across a shared communications channel, the data transmitted from the $k^{th}$ user being transmitted via $n_k$ respective transmit elements. The system comprises a plurality of receive interfaces, each receive interface operative to receive a signal via the communications channel and output a respective sequence of received data elements. The system also comprises a space matched filter connected to the plurality of receive interfaces and operative to (i) assemble the received data elements into sets of received data elements, each set of received data elements including at least one received data element from each sequence of received data elements; and (ii) for each of the plurality of users, jointly process each set of received data elements with each of a plurality of channel data elements to produce a corresponding plurality of filtered data elements for the user, each filtered data element being associated with one of the transmit elements for the user, each channel data element being representative of a portion of the communications channel between an associated one of the transmit elements for the user and the plurality of receive interfaces. The system further comprises a detector connected to the space matched filter and operative to process, for each user, each filtered data element for the user to produce a corresponding decision data set therefor.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1:
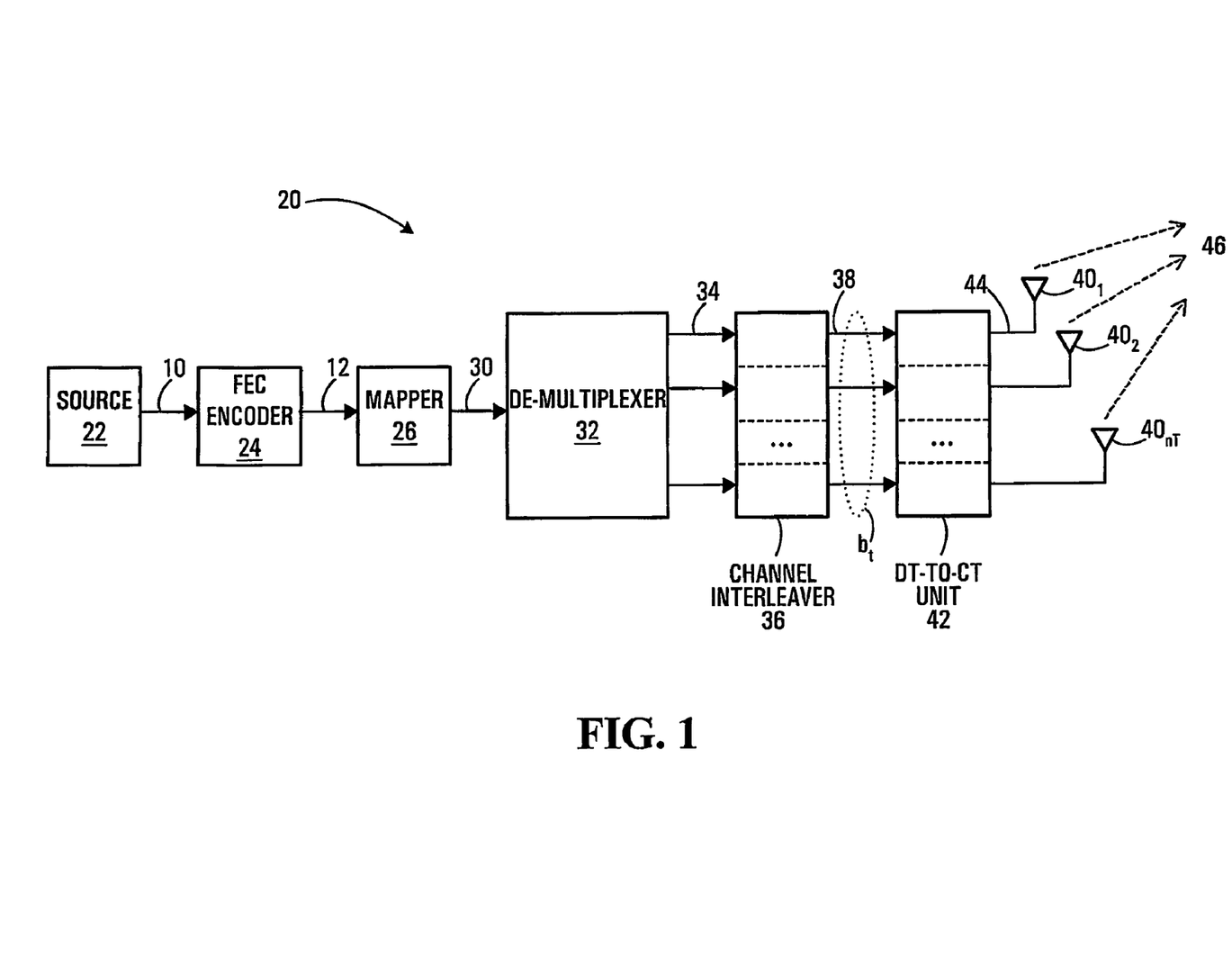
FIG. 1 shows, in block diagram form, a transmitter in accordance with a single-user embodiment of the present invention.

FIG. 1 shows a transmitter 20 in accordance with an embodiment of the present invention. The transmitter 20 receives information symbols 10 constituting a message from a digital data source 22. The information symbols 10 are first passed through a forward error correction (FEC) encoder 24, which is optional. The FEC encoder 24, if used, includes suitable circuitry, software and/or control logic for adding redundancy and/or memory to the information symbols 10 by encoding them into a sequence of coded symbols 12. Suitable embodiments of the FEC encoder 24 include but are not limited to processing blocks implementing encoding operations such as block encoding (e.g., Reed-Solomon encoding), convolutional encoding, parallel or serial concatenated codes (turbo codes based on the concatenation of finite state machine (FSM) encoders) and so on.

The coded symbols 12 are fed to a mapper 26, which includes suitable circuitry, software and/or control logic for translating the coded symbols 12 into a stream of modulation symbols 30. For example, in a specific non-limiting example embodiment, the coded symbols 12 are bits and the modulation symbols are groups of $\log_2 M$ bits, where M is the number of possible modulation symbols. Each modulation symbol includes ½ $\log_2 M$ coded symbols mapped to a component in a first dimension (having $\sqrt{M}$ possible values) and ½ $\log_2 M$ coded symbols mapped to a component in a second dimension (also having $\sqrt{M}$ possible values). The resulting modulation symbol thus can be viewed as representing one of M points in a two-dimensional constellation.

The stream of modulation symbols 30 is fed to a de-multiplexer 32, which includes suitable circuitry, software and/or control logic for separating the modulation symbols 30 into a plurality of modulation symbol sub-streams 34. The de-multiplexer 32 is connected to a channel interleaver 36, which includes suitable circuitry, software and/or control logic for changing the order in which modulation symbols appear within each of the modulation symbol sub-streams 34. The output of the channel interleaver 36 is therefore also a plurality of modulation symbol sub-streams 38. The effect of the channel interleaver 36 is to increase the degree to which channel fading is independent between successive symbols in each of the modulation symbol sub-streams 38. One possible implementation for the channel interleaver 36 is a buffer, which includes a two-dimensional array (i.e., a matrix) for each modulation symbol sub-stream 38 that is written to in a row-by-row manner and read from in a column-by-column manner.

The modulation symbol sub-streams 38 produced by the channel interleaver 36 are fed to a respective plurality of transmit antennas $40_1, 40_2, \ldots, 40_{n_T}$ via a discrete-time (DT) to continuous-time (CT) unit 42. The DT-to-CT unit 42 comprises suitable circuitry, software and/or control logic for applying a suitable modulation scheme to transform each modulation symbol in each of the modulation symbol sub-streams 38 into a continuous-time waveform. Specifically, the output of the DT-to-CT unit 42 is a plurality of continuous-time waveforms 44, which are then sent across a wireless channel 46 by the plurality of transmit antennas $40_1, 40_2, \ldots, 40_{n_T}$. It will be noted that the number of transmit antennas $40_1, 40_2, \ldots, 40_{n_T}$ (and the number of digital symbol sub-streams 38) is $n_T$, where $n_T$ is an integer greater than or equal to two. This permits efficient reuse of the transmission spectrum. The transmit antennas $40_1, 40_2, \ldots, 40_{n_T}$ can be of any suitable type, including but not limited to omni-directional, sectorized, polarization, micro-array, adaptive, smart and so on.

Examples of suitable modulation schemes that can be used by the DT-to-CT unit 42 include, but are not limited to, binary phase-shift keying (BPSK), quadrature phase-shift keying (QPSK), pulse amplitude modulation (PAM), quadrature amplitude modulation (QAM) and spread spectrum modulation (used in code division multiple-access (CDMA) based systems). For example, in M-ary QAM, each digital symbol consists of two components, one of which governs the amplitude of a given carrier signal, while the other governs the amplitude of a phase-shifted version of that carrier signal.

For notational convenience, it is useful to refer to the collection of individual modulation symbols, one from each of the modulation symbol sub-streams 38 (transmitted at a given symbol instant t), as a "transmit symbol vector", hereinafter denoted $b_t = [b_{t,1}, b_{t,2}, \ldots, b_{t,n_T}]^T$, where $^T$ is the transpose operation. In one embodiment, the modulation symbols in the transmit vector $b_t$ will have the same transmission period (i.e., the corresponding continuous-time waveform lasts the same amount of time), will be transmitted simultaneously by the transmit antennas $40_1, 40_2, \ldots, 40_{n_T}$ and will represent the same number of coded symbols. Of course, those skilled in the art will find it within their capabilities to modify these parameters in order to suit particular design requirements.

While traveling through the wireless channel 46, the signals transmitted by the transmit antennas $40_1, 40_2, \ldots, 40_{n_T}$ suffer from co-antenna interference (CAI). Hence, the signals at each of $n_R$ receive antennas will be a superposition of the various transmitted signals. For mathematical convenience, let it be assumed that signals traveling across the wireless channel 46 are affected by quasi-static Rayleigh fading and additive white Gaussian noise, that there is no line of sight (LOS) between any of the transmit antennas and any of the receive antennas. In the case of Rayleigh fading, the amplitudes of the path gains are modeled as samples of a complex Gaussian random variable with a mean of zero and a variance of 0.5 in each dimension. It should be understood, however, that these assumptions are made for mathematical convenience only, and in no way constitute an operational requirement of the present invention. In fact, the present invention will provide improvements regardless of whether the fading is Ricean, Rayleigh, etc., and, moreover, regardless of whether the fading is correlated or uncorrelated.

Based on the above-described channel model, the received vector $r_t = [r_{t,1}, r_{t,2}, \ldots r_{t,n_R}]^T$ at the t-th symbol instant for a transmit symbol vector $b_t = [b_{t,1}, b_{t,2}, \ldots, b_{t,n_T}]^T$ will be given by:

$$r_t = Hb_t + v_t,$$

where H denotes a channel transfer matrix used to describe the effect of fading and multi-antenna interference on the multi-input, multi-output (MIMO) channel 46 and $v_t$ is additive noise (often assumed to be additive white Gaussian noise (AWGN)). Specifically:

$$H = \begin{bmatrix} h_{1,1} & h_{1,2} & \cdots & h_{1,n_T} \\ h_{2,1} & h_{2,2} & \cdots & h_{2,n_T} \\ \cdots & \cdots & \cdots & \cdots \\ h_{n_R,1} & h_{n_R,2} & \cdots & h_{n_R,n_T} \end{bmatrix},$$

where coefficient $h_{i,j}$ is the path gain from the j-th transmit antenna to the i-th receive antenna, $1 \leq j \leq n_T$, $1 \leq i \leq n_R$.

Figure 2:
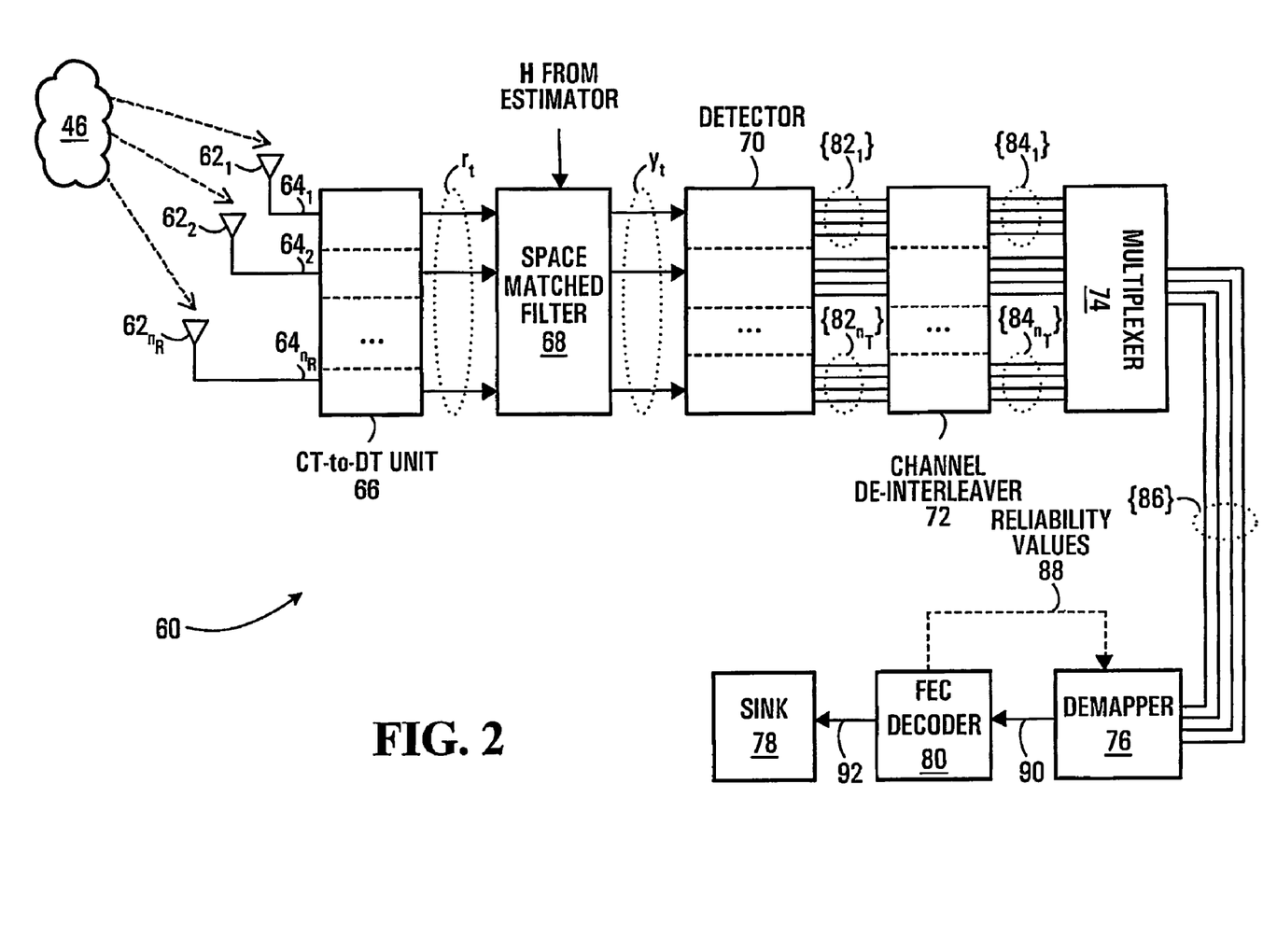
FIGS. 2, 3 and 4 show, in block diagram form, variants of a receiver in accordance with a single-user embodiment of the present invention.

With reference to FIG. 2, the general structure of a receiver 60 in accordance with an embodiment of the present invention is now described. The receiver 60 includes a plurality of receive antennas $62_1, 62_2, \ldots, 62_{n_R}$. It is envisaged that $n_R \geq n_T$. This is usually feasible in an uplink communication scenario because an abundance of antennas and processing power will usually be permitted at the receiver. However, it should be understood that the present invention is not restricted to the uplink communication scenario, nor is there a requirement that for a specific relationship between $n_T$ and $n_R$. In general, all that is required is that $n_T$ and $n_R$, the numbers of transmit and receive antennas, be greater than one. This is generally achievable in both upstream and downstream scenarios.

The receive antennas $62_1, 62_2, \ldots, 62_{n_R}$ can be of any suitable type, including but not limited to omni-directional, sectorized, polarization, micro-array, adaptive, smart and so on. The output of each of the $n_R$ receive antennas $62_1$, $62_2, \ldots, 62_{n_R}$ is a respective continuous-time waveform $64_1$, $64_2, \ldots, 64_{n_R}$, which is provided to a respective portion of a CT-to-DT unit 66. The CT-to-DT unit 66 comprises suitable circuitry, software and/or control logic for discretizing each continuous-time waveform to produce a sequence of numerical values therefrom. In particular, the CT-to-DT unit 66 is operative to demodulate the continuous-time waveforms $64_1$, $64_2, \ldots, 64_{n_R}$ using a demodulation scheme that is the opposite of the modulation scheme used by the DT-to-CT unit 42.

For example, in the case of QAM, the CT-to-DT unit 66 is operable to determine the amplitude of a first component that appears to be modulating a predetermined carrier and the amplitude of a second component that appears to be modulating the 90-degree phase-shifted version of that carrier. For notational convenience, both of these components are represented in a single complex number. Hence, the elements of $r_t$ can be real or complex values.

The vector $r_t$ emerging from the DT-to-CT unit 66 is provided to a space matched filter 68. The basic idea of the space matched filter 68 is to correlate (or match) the vector $r_t$ with a "vector of chip amplitudes" corresponding to each of the transmit antennas $40_1, 40_2, \ldots, 40_{n_T}$. The "vector of chip amplitudes" corresponding to a given transmit antenna is indicative of a channel characteristic associated with that transmit antenna. In one embodiment, the "vector of chip amplitudes" corresponding to a given transmit antenna is indicative of the degree to which the signal from that transmit antenna has been spread out amongst the receive antennas $62_1, 62_2, \ldots, 62_{n_R}$.

In the context of equalization of a multi-input multi-output channel such as the wireless channel 46, the "vector of chip amplitudes" corresponding to the $j^{th}$ transmit antenna is ideally the $j^{th}$ normalized column of the channel transfer matrix H, which is denoted $s_j$. In other words, H can be rewritten as H=SA, where:

S is the matrix of "vectors of chip amplitudes", i.e.:

$$S = [s_1 \cdots s_{n_T}]$$
$$= [h_1/\|h_1\| \ldots h_{n_T}/\|h_{n_T}\|]$$
$$= \begin{bmatrix} s_{1,1} & \cdots & s_{n_T,1} \\ \cdots & \cdots & \cdots \\ s_{1,n_R} & \cdots & s_{n_T,n_R} \end{bmatrix}$$

and

A is an amplitude matrix, i.e.:

$$A = [\|h_1\| \ldots, \|h_{n_T}\|]$$
$$= \begin{bmatrix} A_1 & \cdots & 0 \\ \cdots & \cdots & \cdots \\ 0 & \cdots & A_{n_T} \end{bmatrix}$$

Therefore, space matched filtering performed on the received vector $r_t$ yields a filtered vector, denoted $y_t = [y_{t,1}, y_{t,2}, \ldots, y_{t,n_T}]^T$ and represented as follows:

$$y_t = S^H r_t. \quad \text{(Equation 1A)}$$

Now, it has already been shown that $r_t = Hb_t + v_t$. Therefore, since H=SA, one has:

$$r_t = SAb_t + v_t.$$

Therefore, the filtered vector $y_t$ from (Equation 1A) can be expressed in terms of a correlation matrix R:

$$y_t = S^H S A b_t + S^H v_t \quad \text{(Equation 1B)}$$
$$= R A b_t + n_t$$

where $^H$ denotes the Hermitian operator and R is defined by:

$$R = \begin{bmatrix} 1 & \cdots & \rho_{1,n_T} \\ \cdots & \cdots & \cdots \\ \rho_{1,n_T} & \cdots & 1 \end{bmatrix}$$

where $\rho_{i,j} = <s_i, s_j>$, $\rho_{ij} = \rho^*_{i,j}$, and with the inner product operation $<s_i, s_j>$ signifying $\Sigma_{k=1}$ to $n_R$ $(s_{i,k} s^*_{j,k})$ and * denoting the complex conjugate.

From a mathematical standpoint, Equation 1A shows that the space matched filter 68 executes a matrix multiplication operation on $r_t$ (the received vector), which is a Linear combination of the elements of $r_t$, in order to obtain $y_t$ (the filtered vector). For its part, Equation 1B shows that the elements of $y_t$ are noisy and scaled observations of the elements of $b_t$ (the transmitted vector).

It is also noted that because S is intimately related to H, the space matched filter 68 is assumed to have some knowledge of the channel characteristics, i.e., the columns of H. This is a reasonable assumption, as such characteristics could be measured or estimated directly by the receiver 60 based on observations of the channel 46. Alternatively, the transmitter 20 may be provided with an estimator, which is capable of determining H either partially or completely; knowledge of the channel transfer matrix H could then be supplied to the space matched filter 68. Those skilled in the art will recognize that there is no need for the channel transfer matrix H used in the computations correspond exactly to the actual channel transfer matrix. Advantageous performance can be achieved even if the estimates of the channel state information used by the space matched filter 68 deviate from the actual channel state information. For example, a pre-selected value for the channel transfer matrix H could be used, based on previous measurements or estimates, or based on analytical computations or simplifications. If the elements of H, or the norms of the columns of H, are within, say 10% of their true values, then there will still be advantages to space matched filtering using H.

It is further noted that the $\rho_{ij}$ are correlations between the normalized columns of H, i.e., the columns of S. The correlations $\rho_{ij}$ can be non-zero as the columns of H are not orthogonal. These correlations give rise to co-antenna interference (CAI). For example, the first output of the space matched filter 68 is given by:

$$y_{1,t} = A_1 b_{1,t} + A_2 \rho_{12} b_{2,t} + \ldots + A_{n_T} \rho_{1,n_T} b_{n_T,t} + n_{1,t}. \quad \text{(Equation 2)}$$

Since the desired signal is $A_1 b_{1,t}$, the last $n_T - 1$ terms $$\left( \text{namely,} \sum_{j=2}^{n_T} A_j \rho_{1j} b_{j,t} \right)$$

are due to CAI. Hence, one may consider the transmitted symbol corrupted by two sources of noise, the Gaussian noise term ($n_{1,t}$) and the CAI. The more transmitting antennas there are, the more accurately one may approximate this combined interference for each receive antenna as being Gaussian distributed with a mean and a variance that is function of the $\rho_{ij}$, i.e., the correlation between the columns of H. In an embodiment, a separate processing unit can be provided which would comprise suitable circuitry, software and/or control logic to estimate this mean and variance.

Continuing with the description of the receiver 60 in FIG. 2, the elements of the vector $y_t$ at the output of the space matched filter 68 are fed to a detector 70, which comprises suitable circuitry, software and/or control logic for computing probabilities on the transmitted symbols. That is to say, given the filtered vector $y_t$ at the output of the space matched filter 68, the detector 70 is operative to compute the probability of each element of the transmit symbol vector $b_t$ being equal to a particular modulation symbol represented by real (or complex) components. This can be achieved using maximum likelihood or maximum a posteriori techniques based on the filtered vector $y_t$ and assumptions about the noise statistics through the channel. For instance, the detector 70 can estimate the mean and variance of the noise for each possible modulation symbol in the transmit symbol vector $b_t$. Based on these estimates, the detector 70 computes, for the $k^{th}$ transmit antenna, a set of M probability values $\{82_k\}$, where M denotes the number of possible modulation symbols.

EXAMPLE

Computation of Probability Values

By way of non-limiting example, assume that the information symbols 10 produced by the digital data source 22 are bits and that these bits are coded using a FEC encoder 24 to produce coded symbols 12 (which are also bits). The coded bits 12 are then passed to the mapper 26, which performs binary phase shift keying (BPSK) modulation (M=2), mapping coded bit '0' to modulation symbol '−1' and coded bit '1' to modulation symbol '1'. These modulation symbols are passed to the DT to CT unit 42, which performs amplitude shift keying. Let the resultant continuous waveforms be transmitted over $n_T$=3 transmit antennas, and let the receiver have $n_R$=20 receive antennas. Let the amplitude matrix A of the channel transfer matrix H for one instance of transmission be given by:

$$A = \begin{bmatrix} 2 & 0 & 0 \\ 0 & 2.5 & 0 \\ 0 & 0 & 3 \end{bmatrix}$$

and the correlation matrix R be given by:

$$R = \begin{bmatrix} 1 & 0.2 & 0.1 \\ 0.2 & 1 & 0.15 \\ 0.1 & 0.15 & 1 \end{bmatrix}$$

Let it also be assumed that it is equally likely for a particular modulation symbol to be 1 or −1. Under these circumstances, the mean of the CAI for the first transmit antenna is:

$$\mu_1 = \sum_{j=2}^{3} \sum_{k=1}^{2} A_j \rho_{1j} Q_{jk} P[Q_{jk}] \quad \text{(Equation 3A)}$$

$$= 2.5 * 0.2 * 1 * 0.5 + 2.5 * 0.2 * (-1) * 0.5 +$$
$$3 * 0.1 * 1 * 0.5 + 3 * 0.1 * (-1) * 0.5$$
$$= 0$$

Although for BPSK transmission the mean is 0, in general, this may not be the case.

The variance of the CAI noise for the first antenna is:

$$\sigma_{r1}^2 = \quad \text{(Equation 3B)}$$

$$\sum_{j=2}^{3} \left( \sum_{k=1}^{2} (A_j \rho_{1j} Q_{jk} P[Q_{jk}])^2 - \left( \sum_{k=1}^{2} A_j \rho_{1j} Q_{jk} P[Q_{jk}] \right)^2 \right)$$

$$= ((2.5 * 0.2 * 1 * 0.5)^2 + (2.5 * 0.2 * -1 * 0.5)^2 -$$
$$(2.5 * 0.2 * (1-1) * 0.5)^2) +$$
$$((3 * 0.1 * 1 * 0.5)^2 + (3 * 0.1 * -1 * 0.5)^2 -$$
$$(3 * 0.1 * (1-1) * 0.5)^2)$$
$$= 0.68$$

Assuming that the variance of the AWGN on the channel is 0.5, then the variance of the overall noise is 1.18 (=0.5+0.68). If the output of the space matched filter 68 for the first transmit antenna is assumed to be, say, 0.5, then one implementation of the detector 70 would compute probability on the modulation symbol as follows:

$$P(b_1 \mid y_1) = \frac{1}{\sqrt{2\pi\sigma_{x1}^2}} \exp\left(-\frac{1}{2}\left(\frac{y_1 - \mu_1 - A_1 b_1}{\sigma_{x1}}\right)^2\right)$$

$$= \begin{cases} \frac{1}{\sqrt{2\pi(1.18)}} \exp\left(-\frac{1}{2}\left(\frac{0.5 - 0 - 2}{\sqrt{1.18}}\right)^2\right) \\ \frac{1}{\sqrt{2\pi(1.18)}} \exp\left(-\frac{1}{2}\left(\frac{0.5 - 0 + 2}{\sqrt{1.18}}\right)^2\right) \end{cases}$$

$$= \begin{cases} 0.845, & \text{if } b_1 = 1 \\ 0.155, & \text{if } b_1 = -1 \end{cases}$$

Returning now to the description of the receiver 60, the $n_T$ sets of M probability values each (as produced by the detector 70) are then passed to a channel de-interleaver 72, a multiplexer 74 and then a de-mapper of demodulator 76. The channel de-interleaver 72 performs basically the inverse operations to those of the channel interleaver 36. However, the channel de-interleaver 72 acts on $n_T$ streams of M probability values per stream rather than simply $n_T$ symbol substreams. Thus, the channel de-interleaver 72 comprises suitable circuitry, software and/or control logic for time-rearranging each received stream of sets of probability values $\{82_1\}, \{82_2\}, \ldots, \{82_{n_T}\}$ into a de-interleaved stream of sets of probability values $\{84_1\}, \{84_2\}, \ldots, \{84_{n_T}\}$.

For its part, the multiplexer 74 acts to reassemble the data into the order which existed at the output of the mapper 26. To this end, the multiplexer 74 comprises circuitry, software and/or control logic for combining the de-interleaved sets of probability values $\{84_1\}, \{84_2\}, \{84_{n_T}\}$ into a single stream of sets of probability values $\{86\}$. Each set of probability values in this stream is thus associated with a respective transmitted symbol, with the probability value occupying a particular position in the set representing the likelihood of that transmitted symbol acquiring a corresponding predetermined value.

The de-mapper 76 serves to convert each set of M probability values received from the multiplexer 74 into a hard or soft decision about the transmitted coded symbol. In the case of a hard decision demodulation, the de-mapper 76 may comprise suitable circuitry, software and/or control logic for selecting, as the best transmitted coded symbol, the predetermined symbol corresponding to the position in the set $\{86\}$ which is occupied by the greatest probability value. Of course, other ways of forming hard decisions will be known to those of ordinary skill in the art. In the case of a soft decision, the de-mapper 76 may comprise suitable circuitry, software and/or control logic for creating a probability on each particular transmitted coded symbol by performing a weighted sum on the probabilities from the detector 70. Each element of the sum is weighted by a 1 or 0 depending if the particular coded symbol is contained in the appropriate bit position of the modulation symbol.

For example, for a soft decision 4QAM de-mapper, at the $i^{th}$ received symbol instant, the probability of the 2i-th transmitted coded symbol being 0 is 1*P[modulation symbol for 00]+1*P[modulation symbol for 01]+0*P[modulation symbol for 10]+0*P[modulation symbol for 11]. Similarly, the probability of the (2i+1)-th transmitted coded symbol being 0 is 1*P[modulation symbol for 00]+0*P[modulation symbol for 01]+1*P[modulation symbol for 10]+0*P[modulation symbol for 11]

The output of the de-mapper 76 is fed via link 90 to an FEC decoder 80, which performs the inverse function of the FEC encoder 24 (if such FEC encoder 24 is used). It is noted that if the FEC decoder 80 is a soft-decision FEC decoder 80, then it is possible to configure the FEC decoder 80 to generate reliability values on the transmitted coded symbols (also known as soft decisions or estimates of the coded symbols probabilities). Then, the de-mapper 76 can be changed to merge these (shown by link 88 in FIG. 2) with the probability values arriving from the multiplexer 74. Otherwise the de-mapper 76 simply passes its soft output to the FEC decoder 80 (without iteration). The FEC decoder 80 then provides its output to a data sink 78 via a link 92.

Figure 3:
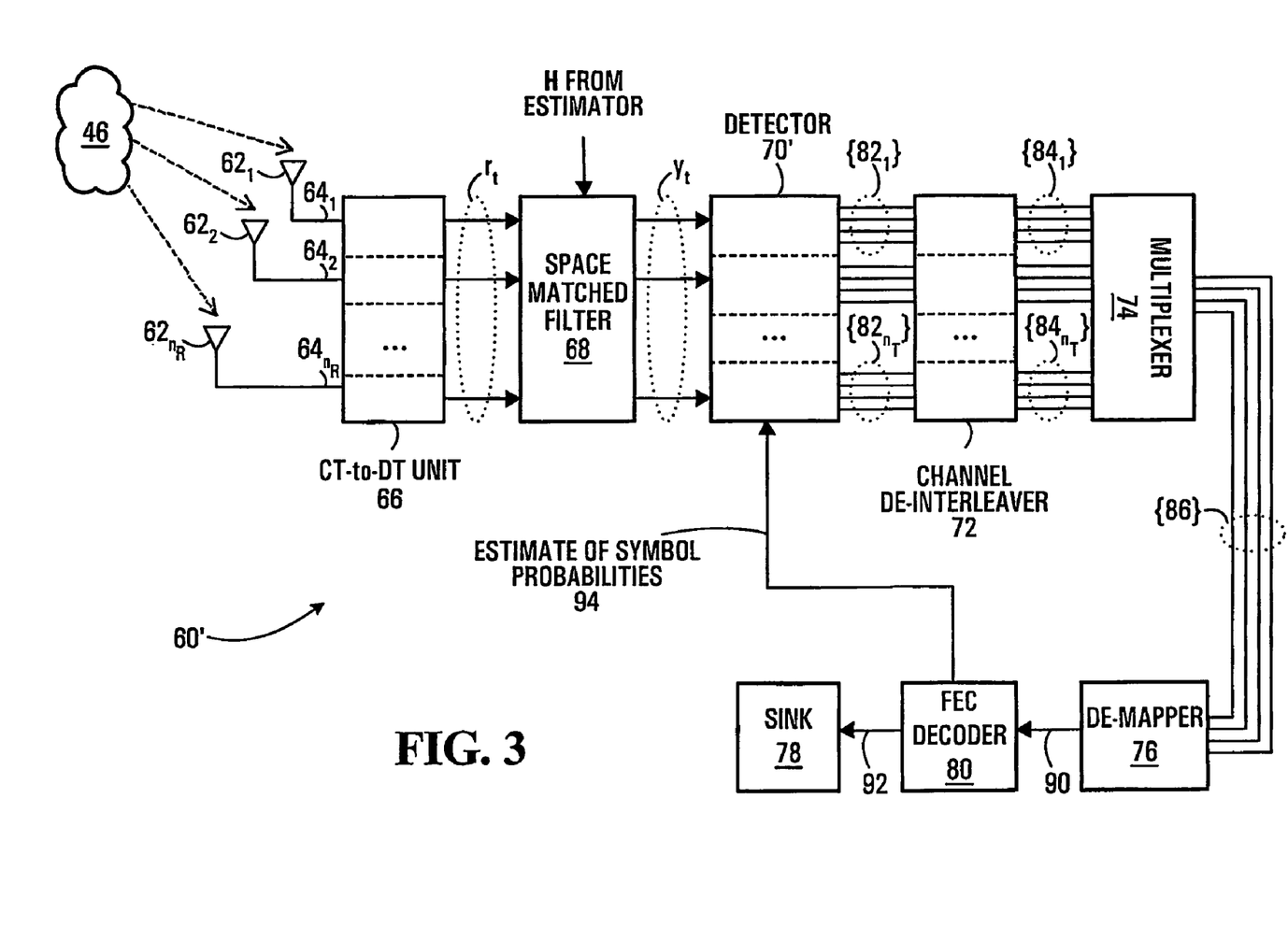

In an alternative embodiment, shown in FIG. 3, the receiver 60' is equipped with iterative processing between the FEC decoder 80 and a modified detector 70'. Specifically, after computing the reliability values on the transmitted coded symbols, the decoder 80 can then reassemble these into reliability values on the transmitted modulation symbols (also known as soft decisions or estimates of probabilities of the modulation symbols). The reliability values (shown by link 94 in FIG. 3) are provided to the detector 70'. Given this additional information, the mean and variance of the CAI noise source may then be re-computed by the detector 70' (using (Equation 3A) and (Equation 3B) above, with different values for the P[$Q_{jk}$]), which will tend to more accurately reflect the actual mean and variance of the CAI.

Figure 4:
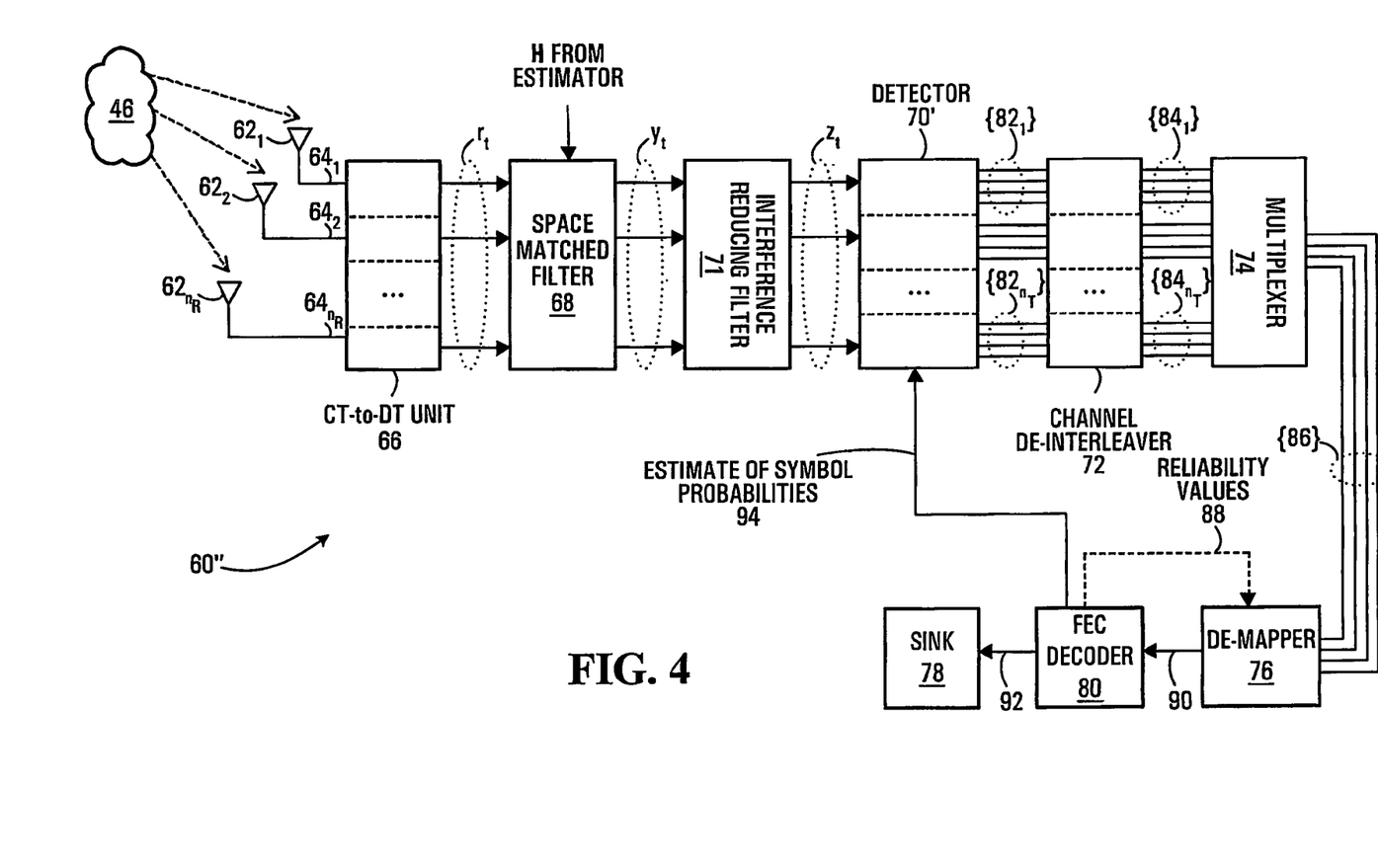

To further improve the performance of the considered system, an interference reducing filter can be applied to the output of the space matched filter 68. One example of a suitable interference reducing filter is a minimum mean square error (MMSE) filter, although other conventional examples of interference reducing filters (e.g., interference reducing filters used in speech systems) are suitable and will be known to those skilled in the art. FIG. 4 illustrates a block diagram of a receiver 60" equipped with this optional functionality. The detector 70 has the same structure as that described in FIG. 2, however it operates on the output of an interference reducing filter 71. In one embodiment, the interference reducing filter 71 is an MMSE filter and performs a function defined by:

$$M_y = (R + \sigma_{AWGN}^2 A^{-2})^{-1}.$$

The output of the interference reducing filter 71 is thus given by:

$$\begin{aligned} z_t &= M_y y \\ &= M_y R A b_t + M_y n_t \end{aligned}$$

which can be written as:

$$z_t = C b_t + w_t,$$

where $C = M_y R A$. One can write the output of the interference reducing filter 71 for the first transmit antenna as:

$$z_{1,t} = C_{11} b_{1,t} + C_{12} b_{2,t} + \ldots + C_{1 n_T} b_{n_T,t} + w_{1,t}, \quad \text{(Equation 4)}$$

where the desired signal is $C_{11} b_{1,t}$, the last $n_T - 1$ terms are due to (reduced) CAI $$\left( \sum_{j=2}^{n_T} C_{1j} b_{j,t} \right)$$

and $w_t$ is assumed to be a Gaussian noise source. Clearly, (Equation 4) is very similar in form to (Equation 2). Hence, it is possible to calculate the mean and variance in a similar fashion as before. Then the detector 70 can compute the probability values on the transmitted symbols and pass these on to the channel de-interleaver 72, multiplexer 74, de-mapper 76 and subsequently to the FEC decoder 80 as has already been described.

Those skilled in the art will appreciate that convenience of mathematical expression has led to the design of a system that is optimized for quasi-static, multi-path fading with little or no intersymbol interference (ISI) between symbols (i.e., the fading is constant over a transmitted multi-symbol packet). While the performance of the present invention may be affected by the degree to which the fading, multi-path and noise conditions divert from those described in the foregoing, it is nonetheless expected that advantage can still be derived from the invention under a wide range of conditions. In other words, the conditions and assumptions described herein for purposes of simplifying the mathematical exercise are not to be construed as limitations upon the usefulness, applicability or scope of the present invention.

For example, the techniques described herein find utilization in the presence of ISI induced by a frequency-selective fading channel. One example of such utilization (e.g., in a TDMA/FDMA uplink/downlink system) involves the use of an ISI reducing equalization filter at the front end of the receiver, in which case the residual ISI contributions will be ignored by the detector 70 and treated as an additional source of noise. Another example of such utilization (e.g., in case of the CDMA uplink transmission) involves the use of a RAKE receiver to collect all the energy of the power delay profile of the signal at the front end of the receiver, in which case one would again proceed as previously described, utilizing the detector 70 and (possibly iterative) post processing after the RAKE receiver pre-processing.

The present invention is also applicable in case of multiple users sharing the same communication channel, e.g., for uplink transmission from the mobile to the base station. Specifically, the receiver described in FIGS. 2, 3 and 4 can be applied directly to the case of TDMA, FDMA and orthogonal CDMA based multi-user communication systems, as the users can be separated due to their presence in different time/frequency/code dimension (i.e., the users are orthogonal). However, for non-orthogonal CDMA systems that employ multiple antenna technology, the following considerations apply.

Figure 5:
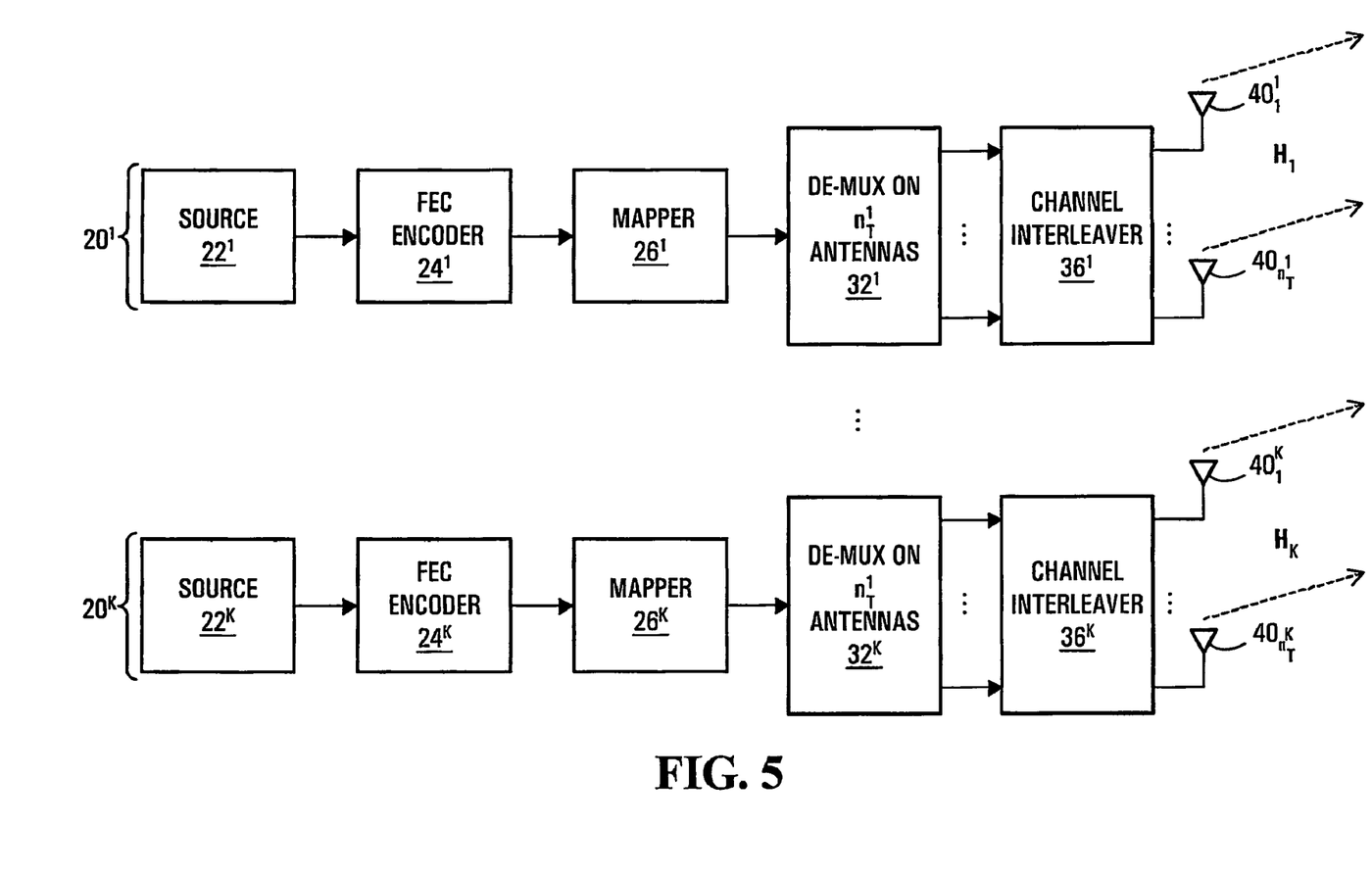
FIG. 5 shows, in block diagram form, a transmitter in accordance with a multi-user embodiment of the present invention.

Specifically, FIG. 5 illustrates a schematic block diagram of a transmission scenario for K users on a CDMA network. Each user has a conventional single user transmitter $20^1, \ldots, 20^K$ with single or multiple antennas, depending on the type of mobile unit (e.g., laptop, cellular phone, PDA, etc.) Thus, each of the transmitters $20^1, \ldots, 20^K$ comprises a respective one of K digital data sources $22^1, \ldots, 22^K$, resulting in the production of K streams of information symbols that pass through respective optional FEC encoders $24^1, \ldots, 24^K$. The FEC encoders $24^1, \ldots, 24^K$, if used, include suitable circuitry, software and/or control logic for adding redundancy and/or memory to each stream of information symbols by encoding them into a respective sequence of coded symbols.

The K streams of coded symbols are fed to a respective plurality of mappers $26^1, \ldots, 26^K$, each of which includes suitable circuitry, software and/or control logic for translating the coded symbols in the respective stream of coded symbols into a respective stream of modulation symbols. (In the specific example being considered here, each mapper includes a respective user's spreading CDMA sequence.) Each stream of modulation symbols is fed to a respective one a plurality of de-multiplexers $32^1, \ldots, 32^K$, each of which includes suitable circuitry, software and/or control logic for separating the respective stream of modulation symbols into a respective plurality of modulation symbol sub-streams. Each de-multiplexer $32^1, \ldots, 32^K$ is connected to a respective channel interleaver $36^1, \ldots, 36^K$, which includes suitable circuitry, software and/or control logic for changing the order in which modulation symbols appear within each of the respective modulation symbol sub-streams. The output of each channel interleaver $36^1, \ldots, 36^K$ is therefore a respective plurality of modulation symbol sub-streams.

The set of modulation symbol sub-streams produced by each of the channel interleavers $36^1, \ldots, 36^K$ are fed to a respective plurality of transmit antennas via a respective DT-to-CT unit (not shown). The DT-to-CT unit modulates each modulation signal sub-stream in accordance with a CDMA chip sequence for that symbol. Specifically, the continuous-time waveforms for the modulation symbol sub-streams produced by channel interleaver $36^1$ are fed to a transmit antennas $40^1{}_1, 40^1{}_2, \ldots, 40^1{}_{n^1_T}$, while the continuous-time waveforms for the modulation symbol sub-streams produced by channel interleaver $36^1$ are fed via a respective transmit antennas $40^2{}_1, 40^2{}_2, \ldots, 40^2{}_{n^2_T}$, and so on. Thus, it is seen that the $k^{th}$ user is associated with $n^k_T$ transmit antennas.

Figure 6:
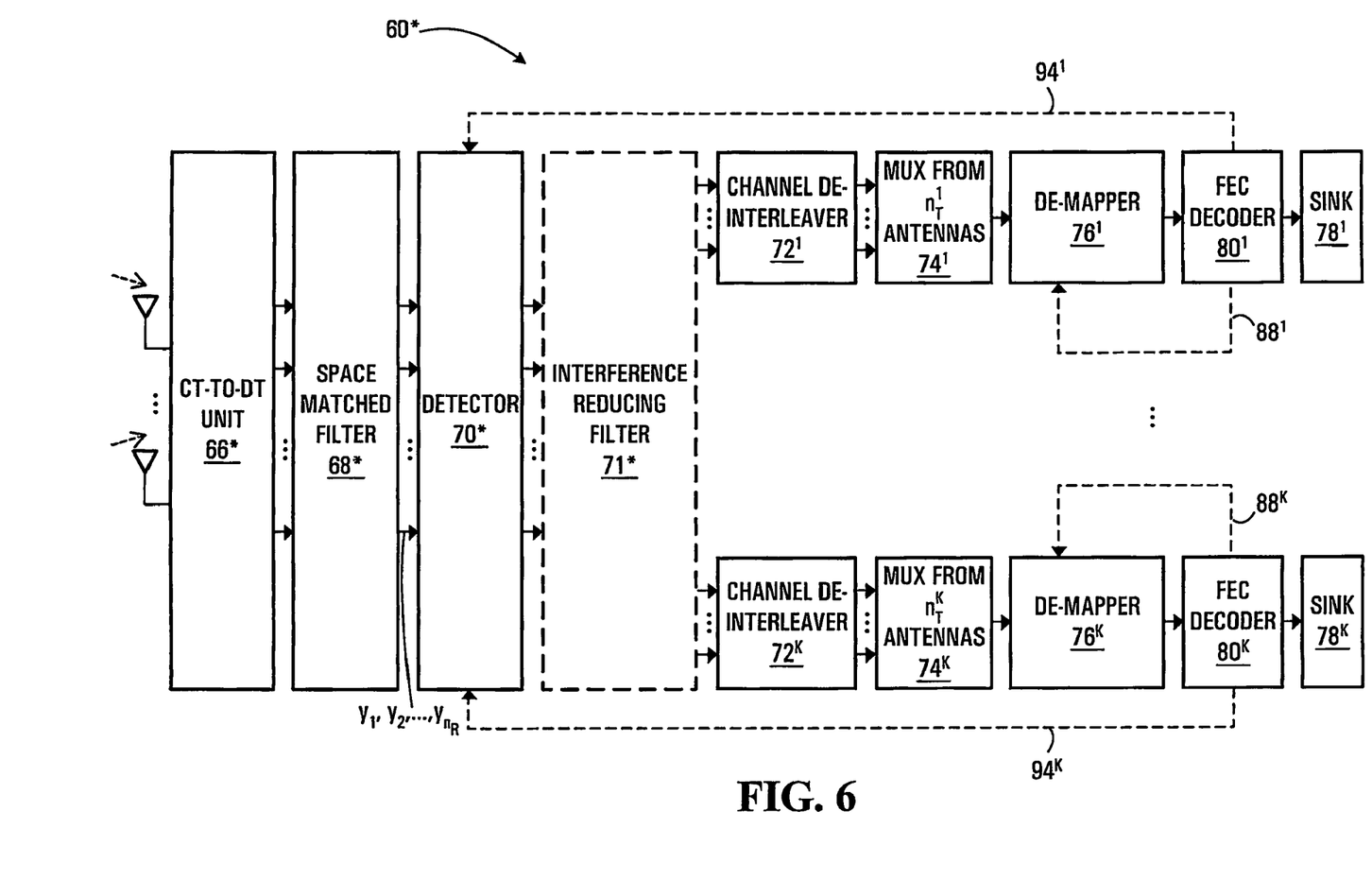
FIG. 6 shows, in block diagram form, options for a receiver in accordance with a multi-user embodiment of the present invention.

FIG. 6 illustrates the schematic block diagram of a receiver 60* (e.g., at the base station) having a multi-user detector/decoder. It is assumed that the scenario of FIG. 5 applies, i.e., there are K distinct users transmitting their data to the base station over the same communication channel, while utilizing $n^k_T$ transmit antennas respectively. The receiver 60* includes $n_R$ receive antennas. Advantageously, $n_R$ will be greater than one. The output of each of the $n_R$ receive antennas is a respective continuous-time waveform, which is provided to a respective portion of a CT-to-DT unit 66\*. The CT-to-DT unit 66 comprises suitable circuitry, software and/or control logic for discretizing each continuous-time waveform to produce a sequence of numerical values therefrom. In particular, the CT-to-DT unit 66\* is operative to demodulate the continuous-time waveforms 64$_1$, 64$_2$, . . . , 64$_{n_R}$ using a demodulation scheme that is based on CDMA chips, i.e., it operates at the chip rate of the DT-to-CT unit in the transmitter (not shown in FIG. 5). The received signal (after the CT-to-DT unit 66\*) can be represented as follows, assuming that the conversion has been done on the CDMA chip level:

$$\begin{bmatrix} H_1 & 0 & \cdots & 0 \\ 0 & H_2 & \cdots & 0 \\ \vdots & \vdots & \ddots & \vdots \\ 0 & 0 & \cdots & H_K \end{bmatrix}$$

$$\begin{bmatrix} [w_1^1, w_1^2, \ldots, w_1^{n_T^1}] & 0 & \cdots & 0 \\ 0 & [w_2^1, w_2^2, \ldots, w_2^{n_T^2}] & \cdots & 0 \\ \vdots & \vdots & \ddots & \vdots \\ 0 & 0 & \cdots & [w_2^1, w_2^2, \ldots, w_K^{n_T^K}] \end{bmatrix} \begin{bmatrix} b_1 \\ \vdots \\ b_K \end{bmatrix}$$

where sub-matrix $H_k$ is an $n_R \times n_T^k$ matrix reflecting the channel attenuation factors between the $n_T^k$ antennas of the $k^{th}$ user and the $n_R$ receive antennas of the base station, the spreading sequence of length N, utilized by the $k^{th}$ user at the $k^{th}$ user's j-th transmit antenna is represented by a column vector $w_k^j$ of size N×1, the data symbols transmitted by the $k^{th}$ user are given by a vector $b_k$ of size $n_T^k \times 1$.

The CT-to-DT unit 66\* is followed by a space matched filter 68\*. The space matched filter 68\* can be implemented as a bank of CDMA matched filters or a suitable CDMA multi-user detector. The basic idea of the space matched filter 68\* is, for each $k^{th}$ user, to correlate (or match) the received vector with a "vector of chip amplitudes" corresponding to each of that user's transmit antennas 40$^k_1$, 40$^k_2$, . . . , 40$^k_{n_T^k}$. The "vector of chip amplitudes" corresponding to a given transmit antenna of a given user is indicative of a channel characteristic associated with that transmit antenna. In one embodiment, the "vector of chip amplitudes" corresponding to a given transmit antenna of a given user is indicative of the degree to which the signal from that transmit antenna of that user has been spread out amongst the $n_R$ receive antennas. In the context of equalization of a multi-input multi-output channel, the "vector of chip amplitudes" corresponding to the $j^{th}$ transmit antenna of the $k^{th}$ user is ideally the $j^{th}$ normalized column of the $k^{th}$ channel transfer sub-matrix $H_k$.

Mathematically, an equation similar to Equation (1B) applies to each $k^{th}$ user. Specifically, denoting $y_k$ as the filtered vector for the $k^{th}$ user (i.e., at the output of the space matched filter 68\*) and ignoring the subscript "t", one has:

$$y_k = R_k A_k b_k + n_k \qquad \text{(Equation 5)}$$

for the amplitude matrix $A_k$ of sub-matrix $H_k$, where $^H$ denotes the Hermitian operator and $R_k$ is defined by:

$$R_k = \begin{bmatrix} 1 & \cdots & \rho_{1,n_T^k}^k \\ \cdots & \cdots & \cdots \\ \rho_{1,n_T^k}^k & \cdots & 1 \end{bmatrix}$$

where $$\rho_{i,j}^k = \langle s_i^k, s_j^k \rangle, \quad \rho_{i,j}^k = \rho_{j,i}^{k*}$$

with $s_i^k$ being the $i^{th}$ column of sub-matrix $H_k$ and with the inner product operation $\langle s_i^k, s_j^k \rangle$ signifying $\Sigma_{m=1 \text{ to } n_R} (s_{i,m}^k s_{j,m}^{*k})$ and * denoting the complex conjugate.

Continuing with the description of the receiver 60\*, the output of the space matched filter 68\* leads to a soft decision detector 70\* and, optionally, an interference reducing filter 71\*. After the detector 70\* (and the optional interference reducing filter 71\*), the data are treated in parallel (i.e., separately) by a bank of de-interleavers 72$^1$, . . . , 72$^K$, followed by a bank of multiplexers 74$^1$, . . . , 74$^K$ and, if used, a bank of FEC decoders 80$^1$, . . . , 80$^K$ for users 1, 2, . . . , K. Hence, the mathematical treatment applied in the single user case be applied as before to estimate the symbols transmitted from each transmit antenna of every user. The output of each decoder 80$^1$, 80$^2$, . . . , 80$^K$ is fed to a respective data sink 78$^1$, 78$^2$, . . . , 78$^K$, one for each of the K users.

It is noted that if the FEC decoders 80$^1$, . . . , 80$^K$ are soft decision decoders, then it is possible to configure these decoders to generate reliability values (shown by links 88$^1$, . . . , 88$^K$ in FIG. 6) on the transmitted coded symbols. In this case, each of the de-mappers 76$^1$, . . . , 76$^K$ can be designed to merge these reliability values with the probability values arriving from the respective multiplexer 74$^1$, . . . , 74$^K$ as.

In an alternative embodiment, the receiver 60\* is equipped with iterative processing. After computing the reliability values on the transmitted coded symbols, the PEC decoders 80$^1$, . . . , 80$^K$ can then reassemble these reliability values into reliability values on the transmitted modulation symbols. These reliability values (also known as soft decisions or probability estimates of the transmitted modulation symbols) are provided to the detector 70\* via respective links 94$^1$, . . . , 94$^K$. Given this additional information, the mean and variance of the CAI noise source may then be re-computed by the detector 70\* (using equations analogous to (equation 3A) and (Equation 3B), above, with different values for the P[$Q_{jk}$]), which will tend to more accurately reflect the actual mean and variance of the CAI.

Those skilled in the art will of course appreciate that among the many variations that achieve the same goal of overall data recovery, one can merge some or all of the CT-to-DT unit 66\*, the space matched filter 68\* and the detector 70\*, or one can change the order in which the space matched filter 68\* and the detector 70\* appear in the receiver 60\*.

Those skilled in the art will also appreciate that the present invention need not be restricted to use in wireless systems. In particular, it is contemplated that the present invention can also be useful to solve detection problems in those situations where the channel over which data is transmitted can be modeled by way of a channel transfer matrix of the type described herein above. Specifically, other examples of such areas of application include, but are not limited to (i) wireline data transmission when data are affected by channel crosstalk; (ii) data readout from CD/DVD/other optical recording medium when multiple lasers and detectors are used concurrently; (iii) data read-out from a magnetic disk or magnetic tape when multiple read-heads are used; and (iv) deep sea data communications. In each of the above scenarios, there exists channel cross-talk due to multiple concurrent transmissions/receptions within the same bandwidth and physical area. The channel transfer matrix can describe the effect of transmission over such a channel and the effects can be exploited to advantage through the use of a space matched filter.

While specific embodiments of the present invention have been described and illustrated, it will be apparent to those skilled in the art that numerous modifications and variations can be made without departing from the scope of the invention as defined in the appended claims.

What is claimed is:

1. A system for estimating data transmitted by a plurality of transmit elements across a communications channel, comprising:
   a) a plurality of receive interfaces, each receive interface operative to receive a signal via the communications channel and output a respective sequence of received data elements;
   b) a space matched filter connected to said plurality of receive interfaces and operative to:
      i) assemble the received data elements into sets of received data elements, each said set of the received data elements including at least one received data element from each sequence of received data elements; and
      ii) jointly process each set of the received data elements with each of a plurality of channel data elements to produce a corresponding plurality of filtered data elements, each filtered data element being associated with one of the transmit elements, each channel data element being representative of a portion of the communications channel between an associated one of the transmit elements and said plurality of receive interfaces; and
   c) a detector connected to said space matched filter and operative to process each filtered data element to produce a corresponding decision data set, the decision data set for each filtered data element includes a soft decision data set comprising a set of values, each value in the set of values being indicative of a likelihood or reliability associated with transmission of a corresponding symbol by the transmit element associated with the particular filtered data element and where the likelihood or reliability includes an a posteriori probability computed at least partly on the basis of:
      iii) the particular filtered data element;
      iv) the corresponding symbol; and
      v) a plurality of correlation data elements, each correlation data element being representative of a relationship between the channel data element associated with the transmit element associated with the particular filtered data element and a corresponding one of the channel data elements associated with a different one of the transmit elements.

2. The system defined in claim 1, wherein each receive interface comprises a respective receive antenna.

3. The system defined in claim 1, wherein said space matched filter being operative to jointly process each set of the received data elements with each of a plurality of channel data elements to produce a corresponding plurality of filtered data elements includes said space matched filter being operative to perform a linear combination of the received data elements in the set of the received data elements to produce each of the filtered data elements.

4. The system defined in claim 3, wherein the number of filtered data elements produced from each set of the received data elements equals the number of transmit elements.

5. The system defined in claim 1, wherein the decision data set for a particular filtered data element includes a hard decision data set for the particular filtered data element.

6. The system defined in claim 1, wherein said space matched filter is further operative to obtain the channel data elements from an external source.

7. The system defined in claim 1, wherein said space matched filter is further operative to compute the channel data elements based on measurements of the communications channel.

8. A system for estimating data transmitted by a plurality of transmit elements across a communications channel, comprising:
   a) a plurality of receive interfaces, each receive interface operative to receive a signal via the communications channel and output a respective sequence of received data elements;
   b) a space matched filter connected to said plurality of receive interfaces and operative to:
      i) assemble the received data elements into sets of received data elements, each said set of the received data elements including at least one received data element from each sequence of the received data elements; and
      ii) jointly process each set of received data elements with each of a plurality of channel data elements to produce a corresponding plurality of filtered data elements, each filtered data element being associated with one of the transmit elements, each channel data element being representative of a portion of the communications channel between an associated one of the transmit elements and said plurality of receive interfaces;
   c) a detector connected to said space matched filter and operative to process each filtered data element to produce a corresponding decision data set therefore;
   d) a multiplexer connected to said detector for combining multiple decision data sets for filtered data elements associated with different ones of the transmit elements into a single sequence of decision data sets; and
   e) a decoder connected to said multiplexer, said decoder being operative to produce a set of information symbols for each decision data set in the sequence of decision data sets; said decoder being further operative to compute statistical properties of transmitted data, wherein said detector being operative to process each filtered data element to produce a corresponding decision data set therefor includes said detector being operative to (iii) compute statistical properties of the communications channel on the basis of the statistical properties of the transmitted symbols received from said decoder and (iv) process each filtered data element on the basis of the statistical properties of the communications channel.

9. The system defined in claim 8, wherein each receive interface comprises a respective receive antenna.

10. The system defined in claim 8, wherein said space matched filter being operative to jointly process each set of the received data elements with each of a plurality of channel data elements to produce a corresponding plurality of filtered data elements includes said space matched filter being operative to perform a linear combination of the received data elements in the set of received data elements to produce each of the filtered data elements.

11. The system defined in claim 10, wherein the number of filtered data elements produced from each set of the received data elements equals the number of transmit elements.

12. The system defined in claim 8, wherein the decision data set for a particular filtered data element includes a hard decision data set for the particular filtered data element.

13. The system defined in claim 8, further comprising a de-mapper connected to said multiplexer, said de-mapper being operative to produce a soft representation for each decision data set in the sequence of decision data sets.

14. The system defined in claim 13, wherein said de-mapper being operative to produce a soft representation for each decision data set in the sequence of decision data sets includes said de-mapper being operative to assign, to a particular data set, a numerical value corresponding to a sum of symbol values weighted by the contents of the particular data set.

15. The system defined in claim 14, wherein the symbol values correspond to numerical representations of respective points in a constellation.

16. The system defined in claim 13, further comprising a decoder connected to said de-mapper, said decoder being operative to transform the soft representations provided by said de-mapper into a stream information symbols.

17. The system defined in claim 16, wherein said decoder is an error correction decoder.

18. The system defined in claim 16, wherein said decoder is selected from the group consisting of a turbo decoder, a Reed-Solomon decoder, a convolutional decoder and a block decoder.

19. The system defined in claim 16, said decoder being further operative to generate reliability values on the information symbols, wherein said de-mapper being operative to produce a soft representation for each decision data set in the sequence of decision data sets includes said de-mapper being operative to produce said soft representation at least partly on the basis of the reliability values from said decoder.

20. The system defined in claim 8, wherein said decoder being operative to produce a set of information symbols for each decision data set in the sequence of decision data sets includes said decoder being operative to select one of a predetermined set of information symbols on the basis of the contents of the particular data set.

21. The system defined in claim 20, wherein each set of information symbols in the predetermined set of information symbols corresponds to a respective point in a constellation.

22. The system defined in claim 8, wherein said space matched filter is further operative to obtain the channel data elements from an external source.

23. The system defined in claim 8, wherein said space matched filter is further operative to compute the channel data elements based on measurements of the communications channel.

24. The system of claim 19, further comprising an interference reducing filter disposed between said space matched filter and said detector.

25. The system of claim 24, wherein the interference reducing filter comprises a minimum mean square error (MMSE) filter.

* * * * *